US012223526B2

(12) United States Patent
Braslavsky et al.

(10) Patent No.: US 12,223,526 B2
(45) Date of Patent: Feb. 11, 2025

(54) FUELING STATION SYSTEM FOR EFFECTING A CONSUMER TRANSACTION

(71) Applicant: Circle K Tech Inc., Laval (CA)

(72) Inventors: David Braslavsky, Ottawa (CA); Deepak Wanner, Ottawa (CA); Jingsong Li, Kanata (CA)

(73) Assignee: Circle K Tech Inc., Laval (CA)

( * ) Notice: Subject to any disclaimer, the term of this patent is extended or adjusted under 35 U.S.C. 154(b) by 41 days.

(21) Appl. No.: 17/695,614

(22) Filed: Mar. 15, 2022

(65) Prior Publication Data

US 2022/0207566 A1 Jun. 30, 2022

Related U.S. Application Data

(63) Continuation-in-part of application No. 16/821,325, filed on Mar. 17, 2020, now Pat. No. 11,713,236.

(60) Provisional application No. 63/205,638, filed on Mar. 15, 2021, provisional application No. 62/825,009, filed on Mar. 27, 2019.

(51) Int. Cl.
*G06Q 30/02* (2023.01)
*G06Q 30/0251* (2023.01)

(52) U.S. Cl.
CPC ..... *G06Q 30/0266* (2013.01); *G06Q 30/0255* (2013.01); *G06Q 30/0271* (2013.01)

(58) Field of Classification Search
CPC ........... G06Q 30/0266; G06Q 30/0255; G06Q 30/0271; G06Q 30/0233; G06Q 20/209; B67D 7/0401; B67D 2007/0442; B67D 2007/0457; B67D 7/145; B67D 7/04; B67D 7/14; H04W 4/80; H04W 4/44; H04W 67/10; G07F 13/025; G07F 9/023; G07F 9/026; G07F 9/0235; G07F 7/1008; G07F 15/001; G06F 3/0481
USPC ..... 141/1; 704/14.27, 14.36, 14.49; 235/381
See application file for complete search history.

(56) References Cited

U.S. PATENT DOCUMENTS

| | | | |
|---|---|---|---|
| 6,070,156 A | 5/2000 | Hartsell, Jr. | |
| 6,152,591 A * | 11/2000 | McCall | B67D 7/14 700/231 |
| 6,523,744 B2 | 2/2003 | Royal et al. | |
| 6,734,798 B2 * | 5/2004 | Smith | G06Q 30/02 235/382 |
| 6,991,160 B2 | 1/2006 | Demere | |
| 7,107,231 B1 | 9/2006 | Hall et al. | |
| 7,948,376 B2 | 5/2011 | DeLine | |
| 8,032,414 B2 | 10/2011 | Payne et al. | |
| 8,438,064 B2 | 5/2013 | Berrio et al. | |

(Continued)

*Primary Examiner* — Timothy P. Kelly
*Assistant Examiner* — Stephanie A Shrieves
(74) *Attorney, Agent, or Firm* — Merchant & Gould P.C.

(57) ABSTRACT

A transaction appliance and techniques for effecting a consumer transaction in a fueling station system is disclosed. Presence of a consumer vehicle at a fuel dispenser is detected and the transaction appliance transmits a transaction trigger to a transaction server located remotely outside the retail fueling station environment. The transaction server responsively invokes personalized consumer data associated with the transaction trigger including advertising and promotions for purchasing products and services from a vendor. The transaction server provides personalized data to a fuel dispenser user interface via the transaction appliance and a user interface system inside the consumer vehicle during a fuel dispensing period.

20 Claims, 5 Drawing Sheets

(56) References Cited

U.S. PATENT DOCUMENTS

| | | |
|---|---|---|
| 9,069,934 B1 | 6/2015 | Meeboer |
| 9,087,427 B2 | 7/2015 | Weston et al. |
| 9,135,615 B1 | 9/2015 | Mutha |
| 9,830,637 B2 | 11/2017 | Betancourt et al. |
| 10,155,652 B2 | 12/2018 | Carapelli et al. |
| 10,332,083 B2 | 6/2019 | Williams et al. |
| 10,678,837 B2 | 6/2020 | Fieglein et al. |
| 10,726,508 B2 | 7/2020 | Morris et al. |
| 11,113,725 B1* | 9/2021 | Sandridge ......... G06Q 30/0269 |
| 2002/0107729 A1* | 8/2002 | Katz .................. G06Q 30/0272 |
| | | 705/14.66 |
| 2002/0147648 A1* | 10/2002 | Fadden ................. G06Q 20/20 |
| | | 705/16 |
| 2003/0028285 A1 | 2/2003 | Zura et al. |
| 2003/0065567 A1 | 4/2003 | Dodson et al. |
| 2003/0130891 A1* | 7/2003 | Jacobs ............... G06Q 30/0269 |
| | | 705/14.66 |
| 2007/0119859 A1 | 5/2007 | Harrell |
| 2008/0308628 A1 | 12/2008 | Payne et al. |
| 2009/0048706 A1* | 2/2009 | DeLine ................. G06Q 50/06 |
| | | 700/231 |
| 2011/0213656 A1* | 9/2011 | Turner .................. B60L 53/665 |
| | | 320/109 |
| 2012/0022956 A1* | 1/2012 | Payne ..................... G07F 9/001 |
| | | 705/16 |
| 2014/0074605 A1 | 3/2014 | Sanchez et al. |
| 2014/0143043 A1* | 5/2014 | Wickramasuriya ......................... H04N 21/41407 |
| | | 705/14.45 |
| 2014/0257989 A1* | 9/2014 | Prakah-Asante .. G01C 21/3484 |
| | | 705/14.63 |
| 2015/0106196 A1 | 4/2015 | Williams et al. |
| 2015/0149284 A1 | 5/2015 | Williams et al. |
| 2015/0242969 A1* | 8/2015 | Pallas ................... B67D 7/145 |
| | | 705/39 |
| 2016/0005100 A1 | 1/2016 | Zaremba et al. |
| 2016/0171472 A1* | 6/2016 | Pugh .................... G06Q 20/322 |
| | | 705/17 |
| 2016/0364718 A1* | 12/2016 | Betancourt ........ G06Q 20/3278 |
| 2017/0308964 A1 | 10/2017 | Morris et al. |
| 2017/0308965 A1* | 10/2017 | Morris ..................... B67D 7/14 |
| 2017/0344233 A1* | 11/2017 | Martensson ............. B67D 7/22 |
| 2017/0362076 A1 | 12/2017 | Hall et al. |
| 2018/0009651 A1 | 1/2018 | Payne et al. |
| 2018/0022596 A1 | 1/2018 | Grice et al. |
| 2018/0108205 A1* | 4/2018 | Symonds ............... G06Q 20/20 |
| 2018/0352265 A1 | 12/2018 | Carapelli |
| 2019/0228480 A1 | 7/2019 | Williams et al. |
| 2019/0295189 A1 | 9/2019 | Strasser |
| 2019/0389718 A1* | 12/2019 | Patil ................... G06Q 20/4014 |
| 2020/0122998 A1 | 4/2020 | Stumpf |
| 2020/0307988 A1 | 10/2020 | Braslavsky et al. |
| 2022/0081278 A1 | 3/2022 | Braslavsky et al. |

\* cited by examiner

FUELING STATION SYSTEM FOR EFFECTING A CONSUMER TRANSACTION

PRIORITY CLAIM

This application claims priority to U.S. Provisional Application Ser. No. 63/205,638, filed on Mar. 15, 2021, and is a continuation-in-part patent application of U.S. patent application Ser. No. 16/821,325 filed on Mar. 17, 2020, which claims priority to U.S. Provisional Application Ser. No. 62/825,009, filed Mar. 27, 2019, the entire disclosure(s) of which are hereby expressly incorporated herein by reference.

TECHNICAL FIELD

The present disclosure relates generally to methods and systems for presenting personalized data to a user of a fueling station system.

BACKGROUND

Within a retail fueling station environment, a consumer transaction at a fuel dispenser involves interaction between the consumer and a fuel dispenser user interface. Each step for initiating the fueling session generally requires the consumer to input fueling preferences such as the fuel grade, the amount of fuel, payment information and the like. If a consumer is a repeat or regular client, the consumer generally must reenter the same fueling preferences and payment information each time the consumer wishes to initiate a fueling session, which is repetitive and time consuming.

Some fuel dispensers display bulk advertising promotions on a visual display associated with (e.g., typically integrated into) that fuel dispenser to engage the consumer during the fuel dispensing period. The bulk advertising promotions which are targeted to a wide consumer audience may or may not be relevant or applicable to the consumer. Further, the visual display device is generally not visible to one or more consumers inside the vehicle not in close proximity to the visual display device (e.g., a waiting family member inside the vehicle). Additionally, the consumer's native language may be different from the language provided by the fuel dispenser user interface, hence the consumer may not understand the advertising promotions nor understand how to respond to the related prompts.

Additionally, conventional fuel dispensers provide a user interface that may vary in different fuel environments or by fuel brand or the installed fuel dispenser manufacturer. For example, the consumer may be required to respond to an inquiry to receive a payment receipt. Based upon the fuel dispenser user interface, the receipt inquiry may be presented before fuel dispensing or after fuel dispensing. Hence, the consumer may not know when a response to an inquiry is required.

The complexities of different user interfaces, time consuming input requirements, security concerns, and non-relevant and potentially annoying advertising pose problems for effecting a consumer transaction. These problems could dissuade the consumer from purchasing products and services or further cause the consumer to avoid the retail site in the future. While it may be possible to overcome the aforementioned problems with system enhancements, fueling station retailers are equally dissuaded by the upgrade costs for new fuel dispensers, application servers, software and collateral equipment; thereby preventing adoption and widespread deployment. Accordingly, there is a need to provide an improved fueling station system for effecting a consumer transaction.

SUMMARY

Generally, the present disclosure relates to improved systems and methods for effecting a consumer transaction at a fueling station. One embodiment is a system for presenting personalized consumer data to a consumer at a fuel dispenser during a fuel dispensing period. The system is configured to display personalized consumer data including an advertisement or one or more redeemable discount coupons for purchasing products and services, triggered by the presence of a consumer vehicle at a fuel dispenser. In some embodiments, the system presents personalized consumer data related to products and services from a vendor that is intended to interest the consumer, and further facilitates a consumer transaction to minimize otherwise required consumer interaction. Thus, the system provides the consumer a user-friendly streamlined experience for purchasing products and services from a vendor during the time the consumer is dispensing fuel and shortly thereafter.

One embodiment is a system for displaying content within a retail fueling station environment. The system includes a transaction appliance located within the retail fueling station environment and configured to receive vehicle information from a fuel dispenser over a local area network. The system also includes a transaction server implemented on a computing system located remotely outside the retail fueling station environment and configured to receive the vehicle information from the transaction application over a wide area network, to process the vehicle information to determine a consumer characteristic of an occupant of the vehicle, to obtain a first content item based on the consumer characteristic for display at the fuel dispenser during a fuel dispensing period, and to obtain a second content item based on the consumer characteristic for display at the vehicle during the fuel dispensing period.

Another embodiment is a method of displaying content within a retail fueling station environment. The method includes receiving, at a transaction appliance located within the retail fueling station environment, vehicle information from a fuel dispenser over a local area network; and receiving, at a transaction server implemented on a computing system located remotely outside the retail fueling station environment, the vehicle information from the transaction application over a wide area network. The method also includes processing the vehicle information to determine a consumer characteristic of an occupant of the vehicle; obtaining a first content item based on the consumer characteristic for display at the fuel dispenser during a fuel dispensing period; and obtaining a second content item based on the consumer characteristic for display at the vehicle during the fuel dispensing period.

Yet another embodiment is another method of displaying content within a retail fueling station environment. The method includes detecting a vehicle proximate to a fuel dispenser; obtaining vehicle information of the vehicle via a wireless communication module; relaying the vehicle information to a transaction server implemented on a computing system located remotely outside the retail fueling station environment; and obtaining consumer information of an occupant of the vehicle at the transaction server. The method also includes processing the vehicle information and the consumer information to determine one or more consumer characteristics of using the retail fueling station environment; determining a first content item for display at the fuel dispenser based on the one or more consumer characteristics; determining a second content item for display at the vehicle based on the one or more consumer characteristics; displaying the first content item at the fuel dispenser during a fuel dispensing period; and displaying the second content item at the vehicle during the fuel dispensing period.

DETAILED DESCRIPTION

Figure 1:
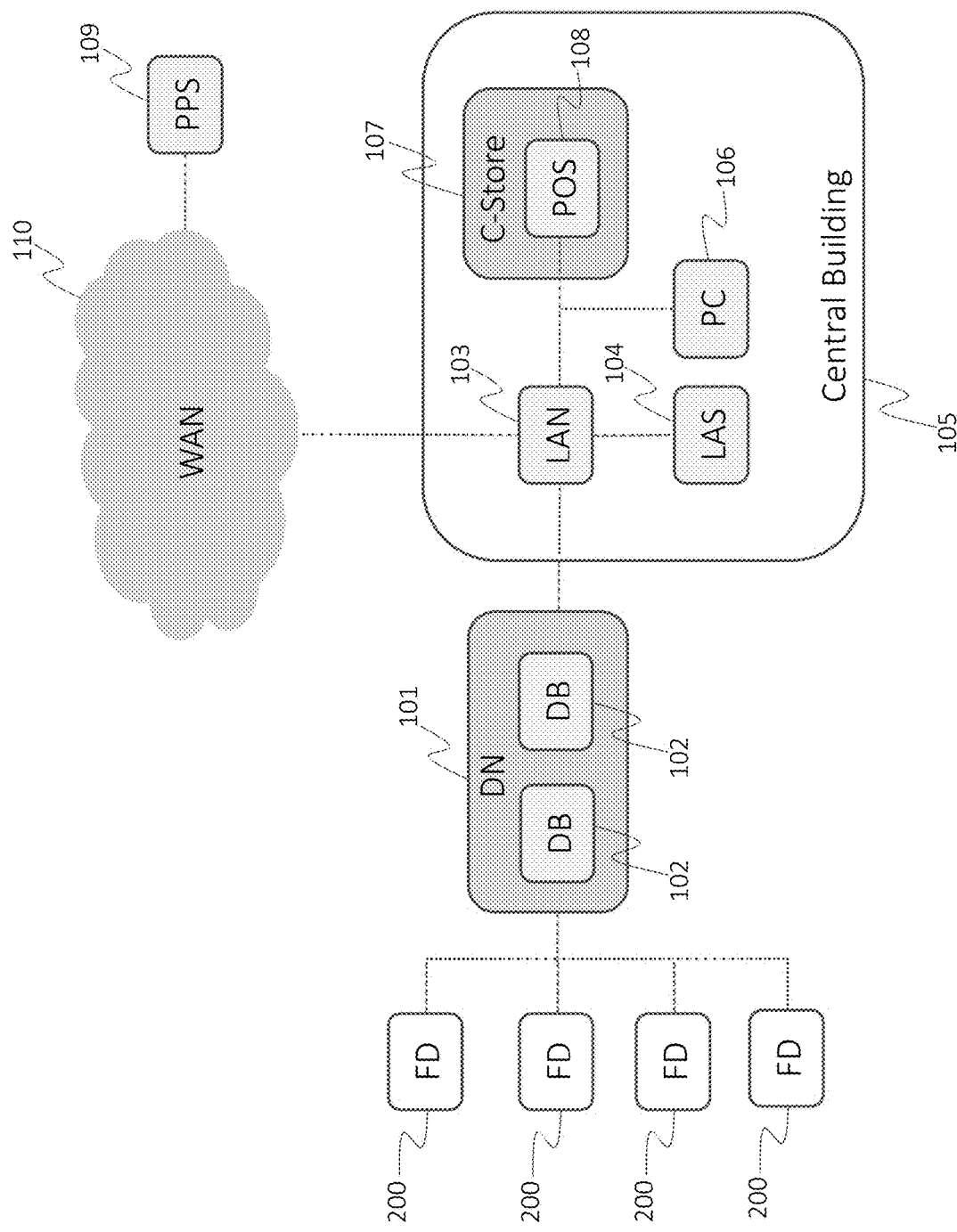
FIG. 1 is a block diagram of an example retail fueling station environment in accordance with some embodiments.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," and "including" are interchangeable and not intended to be limiting. The term "such as" also is not intended to be limiting. For example, the term "including" shall mean "including, but not limited to."

FIG. 1 is a block diagram of an example retail fueling station environment in accordance with some embodiments. The retail fueling station environment typically includes a central building 105, one or more fuel dispensers (FD) 200, and a dispenser network (DN) 101. The central building 105 may include a premises controller (PC) 106, a point of sale (POS) 108 system, local application server (LAS) 104, a convenience store (C-Store) 107, and may also include a quick serve food outlet or restaurant.

The premises controller 106 controls the fuel dispensers 200 and processes transactions as well as other related activities. The premises controller 106 may be a standalone component or may be incorporated within the point of sale system 108. The premises controller 106 communicates with a remote payment processing system (PPS) 109 for authorizing payment transactions as well as other related activities by way of a communication link to a wide area network (WAN) 110. In some embodiments, the local application server 104 manages the payment transaction as well as other related activities. The local application server 104 may communicate with the remote payment processing system 109 for authorization of payment transactions via a communication link to the wide area network 110.

The plurality of fuel dispensers 200 are operatively connected to the dispenser network 101 which generally includes a dispenser hub which may be accomplished via additional devices, such as distribution box (DB) 102 as is understood in the art. The dispenser network 101 is operatively connected to the premises controller 106 via a premises local area network 103 or other intermediate devices such as a network router.

Figure 2:
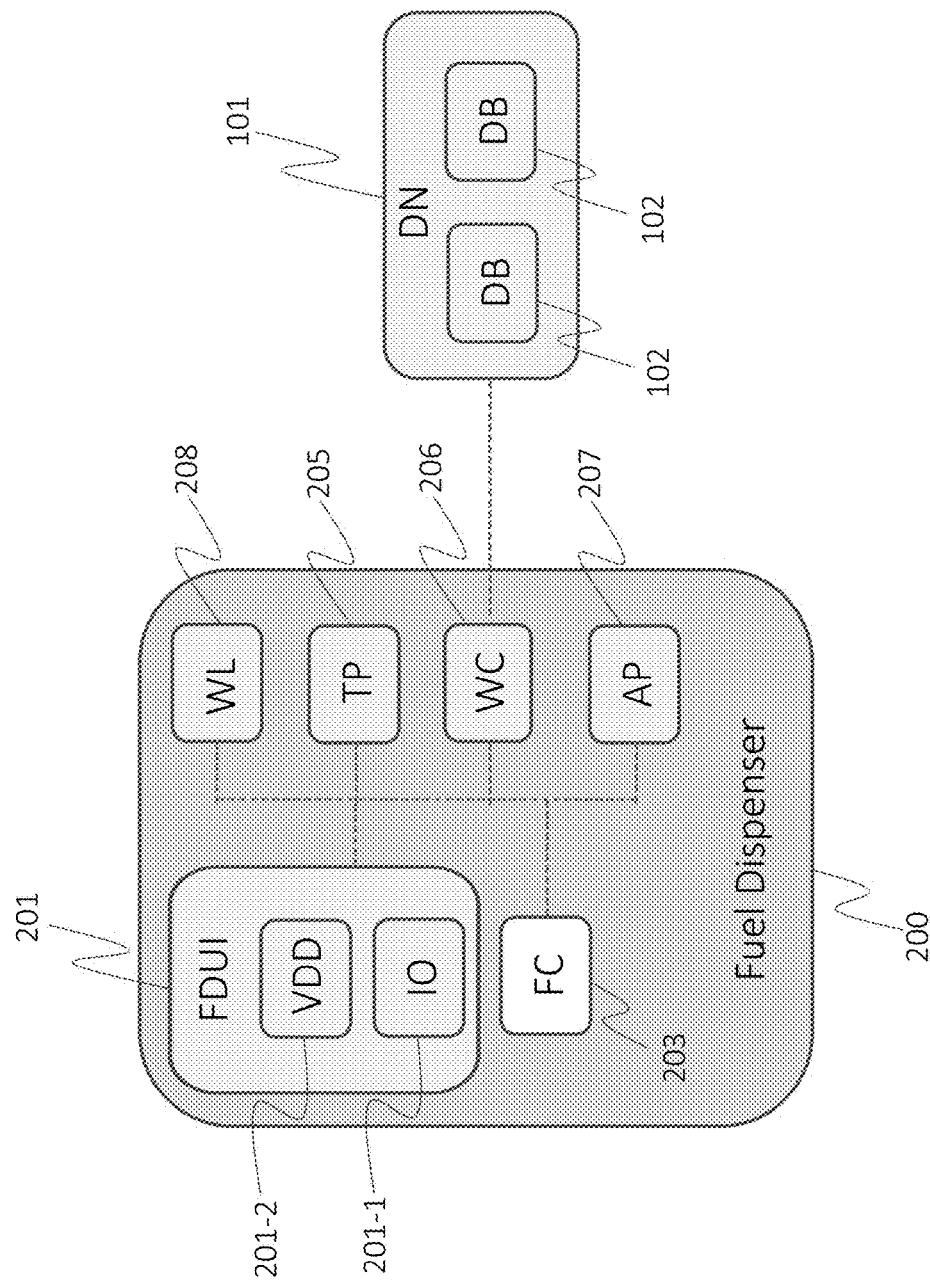
FIG. 2 is a block diagram of an example fuel dispenser in accordance with some embodiments.

FIG. 2 is a block diagram of an example fuel dispenser 200 in accordance with some embodiments. The fuel dispenser 200 includes a fuel dispenser user interface (FDUI) 201, one or more controllers, and one or more communication modules. The controllers include a fuel dispensing controller (FC) 203, one or more transaction processors (TP) 205, and one or more application processors (AP) 207. The communication ports include a wired communication port (WC) 206 and may also include a wireless communication port (WL) 208. The wireless communication port 208 may include a wireless network, such as a BLUETOOTH® network, a Wi-Fi network, a near field communication (NFC) network, a ZIGBEE network, combinations of the aforementioned networks, and/or the like. The wired communication port 206 operatively connects the fuel dispenser 200 to the dispenser network 101, the local area network 103, or other intermediate devices such as a network router.

The fuel dispenser user interface 201 includes components to facilitate consumer interaction with the fuel dispenser 200. The fuel dispenser user interface 201 includes a keypad component for inputting data for purchasing fuel or other products and/or services. The keypad component is also used for inputting an authentication code or a personal identification number. The fuel dispenser user interface 201 may also include other input and output components 201-1 including buttons, a camera, an optical reader, facial recognition and/or other biometric sensors as well as a printer so that a transaction receipt and/or a coupon may be printed and presented to the consumer.

The fuel dispenser user interface 201 also includes a visual display device (VDD) 201-2 to provide personalized information, such an advertisement or one or more redeemable discount coupons for purchasing products and services from a vendor or other data related to loyalty programs, promotions and contests. The visual display device 201-2 may include a graphical user interface (GUI) that facilitates the consumer transaction such as an LCD or AMOLED display. The visual display device 201-2 may also include a touchscreen allowing the consumer to use soft keys to respond to transaction information requests presented to the consumer via the touchscreen. Transaction information may include, for example, transaction data for purchasing fuel or other products and/or services as well as to enter an authentication code or a personal identification number (PIN).

Figure 3:
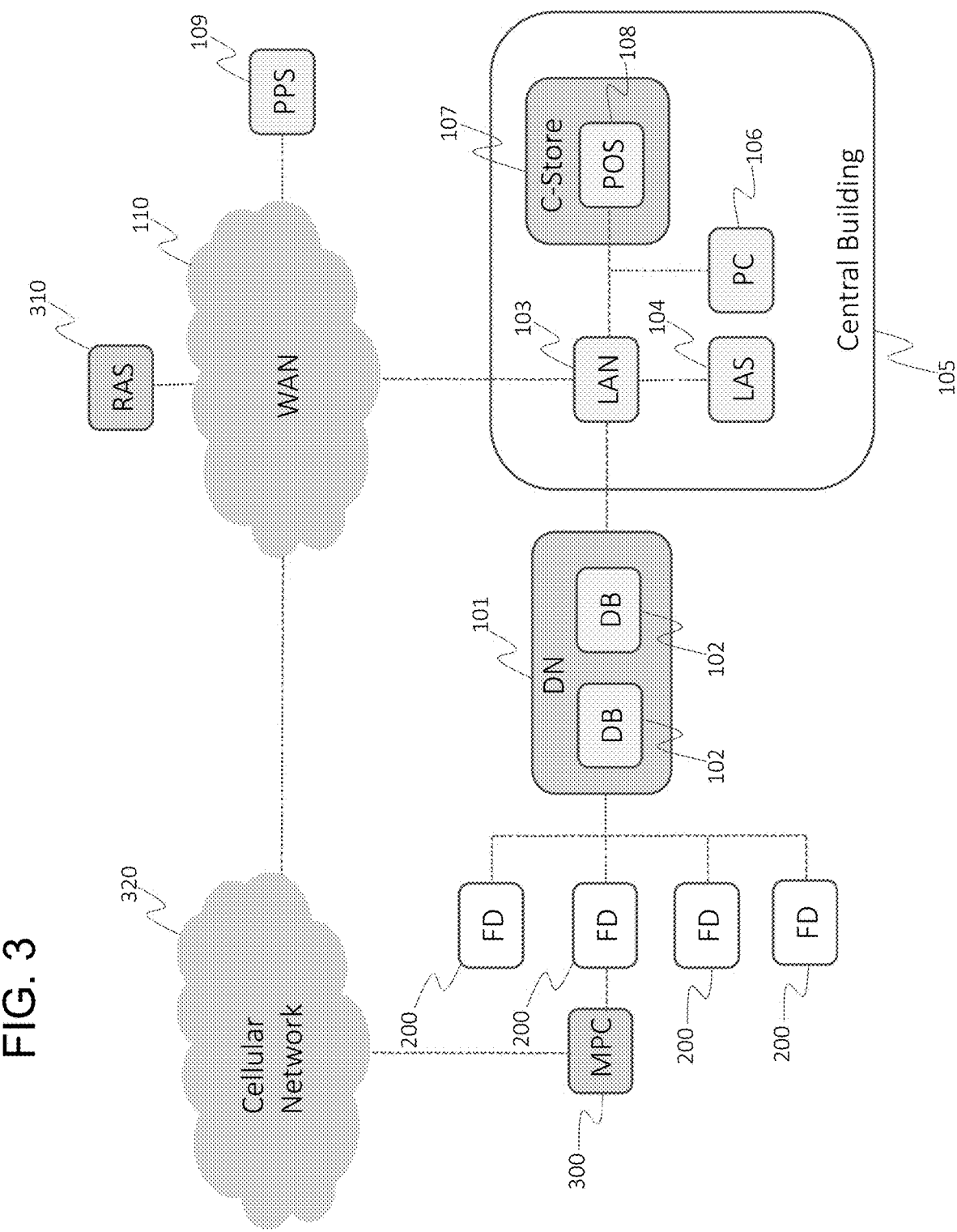
FIG. 3 is a block diagram of another example retail fueling station environment in accordance with some embodiments.

FIG. 3 is a block diagram of another example retail fueling station environment in accordance with some embodiments. In particular, FIG. 3 illustrates a personal communication device (MPC) 300 used with a fuel dispenser 200. The personal communication device 300 includes a visual display device attached thereto including a graphical user interface to facilitate the consumer transaction. The visual display device includes an LCD or AMOLED display and may also incorporate a touchscreen panel allowing the consumer to use soft keys to respond to information requests presented to the consumer, for example inputting transaction data for purchasing fuel or other products and/or services as well as to enter an authentication code or a personal identification number (PIN). The personal communication device 300 may also include other input and output components including keys, buttons, a camera, an optical reader, facial recognition and/or other biometric sensors as well as a visual display so that a transaction receipt, QR code, barcode and/or other form of machine-readable label may be provided to the consumer.

The fuel dispenser applications processor 207 of the fuel dispenser 200 may operatively connect with the personal communication device 300 to receive user information, and provide the user information to a device or system located within the retail fueling station environment via the dispenser network 101, local area network 103, or other intermediate devices. Alternatively or additionally, the personal communication device 300 communicates with a remote application server (RAS) 310 and/or remote payment processing system 109 for authorization of the payment transaction by way of a cellular and/or wireless network 320.

Figure 4:
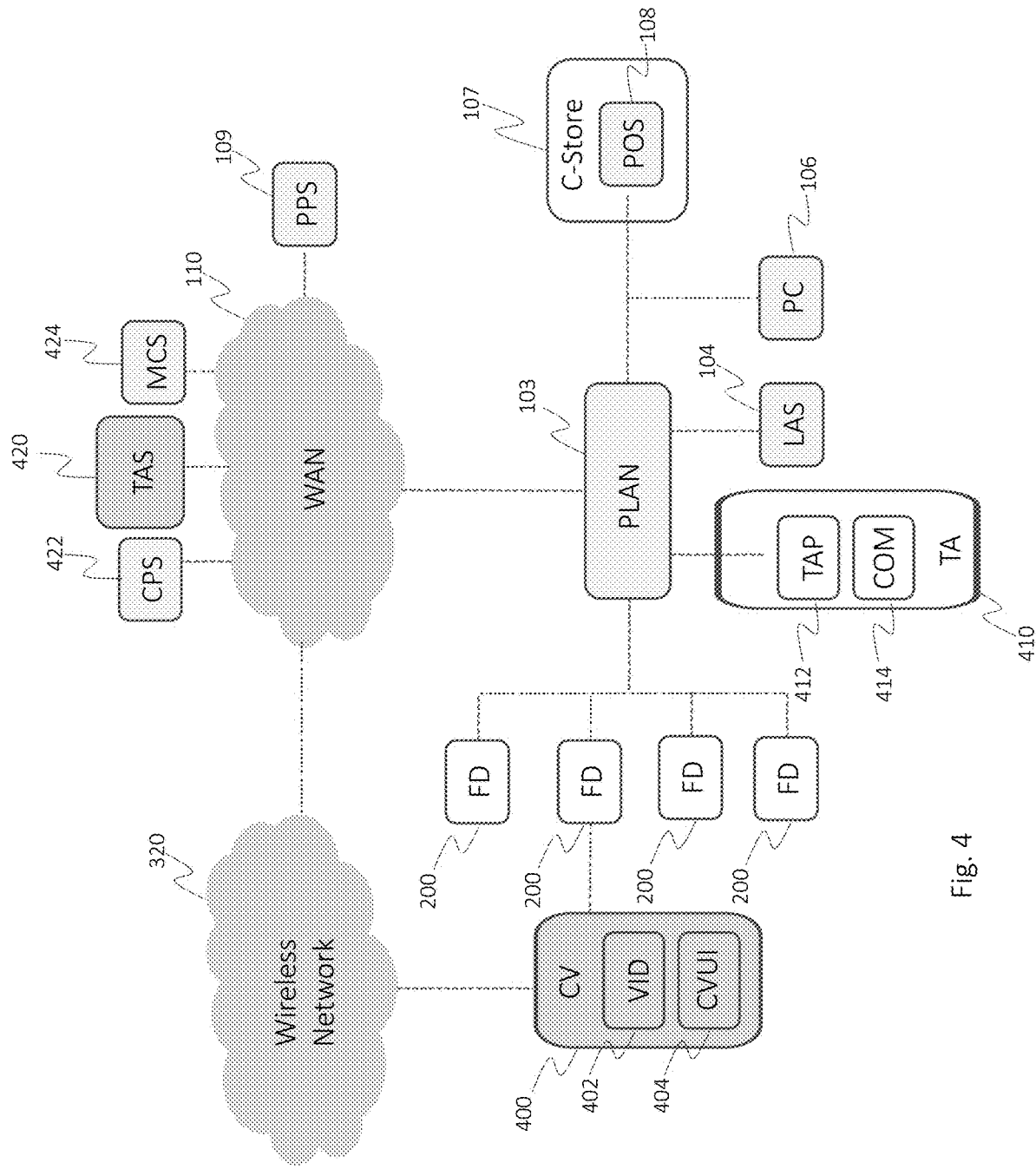
FIG. 4 is a block diagram of yet another example retail fueling station environment in accordance with some embodiments.

FIG. 4 is a block diagram of yet another example retail fueling station environment in accordance with some embodiments. In particular, FIG. 4 illustrates the use of a transaction appliance 410 and transaction server 420 to provide personalized content, such as a personalized vendor offer, to one or more persons at a fuel dispenser 200 and/or within a vehicle 400 proximate to the fuel dispenser 200. Generally, the transaction appliance 410 is located within the retail fuel station environment such as in the central building 105, or otherwise communicatively connected between the central building 105 and the fuel dispensers 200. The transaction appliance 410 operatively connects to a transaction server (TAS) 420 located remotely outside the retail fueling station environment via the wide area network 110.

The transaction appliance 410 includes an application processor (TAP) 412 and one or more communication ports (COM) 414. The transaction appliance 410 is operatively connected to the wide area network (WAN) 110 and the plurality of fuel dispensers 200 via the premises local area network (PLAN) 103, or other intermediate devices such as a router. In one embodiment, consumer vehicle information is transmitted to the transaction appliance 410 which responsively transmits the consumer vehicle information to the transaction server (TAS) 420.

Alternatively or additionally, the transaction appliance 410 may obtain/send other consumer information such as data related to a user's interaction or behavior with the fuel dispenser 200 or fueling environment. For example, a communication port 414 of the transaction appliance may intercept customer information sent between the fuel dispenser 200 and the point of sale system 108. Alternatively or additionally, the transaction appliance 200 may receive information of a current location or activity performed by a user within the fueling environment as captured by the fuel dispenser 200 or other camera/sensor within the fueling environment.

The transaction server 420 is configured to receive the information from the transaction application 410 over the wide area network 110, and to process the information to determine a consumer characteristic of a user of a fuel dispenser 200 and/or occupant of the vehicle 400. The transaction server 420 may include or connect with a remote consumer profile server (CPS) 422 and a remote media content server (MCS) 424. The remote consumer profile server 422 may receive or correlate the consumer vehicle data, consumer profile data, consumer history data, loyalty program data, and fueling preferences. For example, the remote consumer profile server 422 may match the consumer vehicle data with a with a known consumer identity to access a database(s) including consumer profile data, consumer history, loyalty program data and fueling preferences.

The consumer profile data may include associated names, payment method, a user identity, images and other biometric information. The consumer history data may include previously visited fuel dispensers and other vendor locations. The loyalty program data may include a loyalty identifier number, rewards, whether to apply loyalty rewards and/or to promote a purchase of products and/or services and the like. The fueling preferences may include preferred fuel grade fuel type and the amount of fuel required to fill the fuel tank as obtained from the consumer vehicle information.

In one embodiment, the transaction server 420 and/or remote consumer profile server 422 is configured to process the vehicle information to determine a consumer characteristic of an occupant of the vehicle 400. For example, the transaction server 420 may determine a demographic or identity of the user based on extracted vehicle or consumer data. The consumer characteristic may be based on a match or likelihood of belonging to a demographic based on population data and/or historical data of an individual tracked over time at one fueling station environment and/or multiple different fueling station environments.

Alternatively or additionally, the transaction server 420 may processes other consumer information (e.g., data extracted from fuel transaction payment) to determine one or more consumer characteristics. Still further, in some embodiments, one or more consumer characteristics may be obtained at the transaction server 420 directly from the transaction application 410, such as information regarding a user's location or behavior within a fueling environment.

The remote media content server 424 is configured to dynamically select/provide customized or targeted advertisements. For example, the remote media content server (MCS) 424 provides advertisements specified by the vendor or a remote vendor. Remote vendors are remote in the sense that they are not located at the retail fueling facility and includes a commercial seller of products and/or services, vehicle parts, food and drink, etc. Hence a vendor and a remote vendor can proactively market and/or or sell products and services by way of merchandising content, advertisements and pricing data as well as provide coupons regarding products and/or services.

In one embodiment, the transaction server 420 and/or remote media content server 424 is configured to obtain one or more first content items based on the consumer characteristic for display at the fuel dispenser 200 during a fuel dispensing period, and to obtain one or more second content items based on the consumer characteristic for display at the vehicle 400 during the fuel dispensing period. In some embodiments, a first content item and a second content item are simultaneously displayed on a graphical user interface of the vehicle and a graphical user interface of the fuel dispenser, respectively. The first content item and the second content item may comprise differences based on a profile or one or more consumer characteristics determined and/or provided by the remote consumer profile server 422. For example, for users having a profile match indicating occupants are likely to be waiting in the car during the fueling period (e.g., based on vehicle characteristics, past behavior of similar users, and/or current/past behavior of this vehicle/user), the transaction server 420 may select a personalized vendor offer for vehicle display that differs in length or content as compared to fuel dispenser display content to increase opportunity of user interaction with the content.

In any case, the transaction server 420 produces personalized consumer data such as an advertisement or one or more redeemable coupons for purchasing products and services from a vendor as well as other data related to loyalty programs, promotions and contests. The personalized consumer data may be provided to the transaction appliance 410 via the wide area network 110. The transaction appliance 410 in turn transmits the personalized consumer data to a fuel dispenser visual display device 201-2 via the dispenser network 101, the local area network 103, or other intermediate devices, such as a router.

In one embodiment, the transaction appliance 410 is configured to receive the first content item from the transaction server 420 via the wide area network 110, and to provide the first content item to the fuel dispenser 200 that sent the vehicle information. In another embodiment, the transaction appliance 410 is further configured to receive the second content item from the transaction server 420, and to provide the second content item to the vehicle 400 proximate to the fuel dispenser 200 (e.g., via the fuel dispenser 200 and/or wireless communication). In an alternative embodiment, the transaction server 420 is configured to provide the second content item to a graphical user interface of the vehicle 400 via a second communication network separate from the local area network 103 of the retail fueling station environment (e.g., via cellular and/or wireless network 320).

As shown in FIG. 4, the consumer vehicle (CV) 400 may include a vehicle identification device (VID) 402 and/or a vehicle user interface 404 (CVUI). The vehicle user interface 404 may comprise a subsystem of a vehicle infotainment system, a personal communication device, combinations of the aforementioned, and/or the like. Generally, the vehicle user interface 404 includes a visual display device attached thereto, such as an LCD or AMOLED display and/or touchscreen panel, including a graphical user interface (GUI) facilitates the consumer transaction. For example, the vehicle user interface 404 may allow the consumer to use soft keys to respond to information requests presented to the consumer via the touchscreen panel by inputting transaction data for purchasing fuel or other products and/or services as well as to enter an authentication code or a personal identification number (PIN). The vehicle user interface 404 may also include input and output components including keys, buttons, a camera, an optical reader, facial recognition and/or other biometric sensors as well as a visual display so that a transaction receipt, QR code, barcode and/or other form of machine-readable label may be provided to the consumer.

In one embodiment, vehicle identification device 402 is configured to establish a first network communication with the fuel dispenser wireless communication port 208 in a vicinity of the vehicle 400. The first network may include a wireless network, such as a BLUETOOTH® network, a Wi-Fi network, a near field communication (NFC) network, a ZIGBEE network, combinations of the aforementioned networks, and/or the like. In some implementations, the vehicle identification device 402 broadcasts a signal identifying the vehicle identification, and the fuel dispenser wireless communication port 208 identifies the vehicle identification device 402 based on the signal when the consumer vehicle and the vehicle identification device are within a vicinity of the first network. Accordingly, presence of the vehicle 400 at a fuel dispenser 200 is detected and the fuel dispenser 200 can receive consumer vehicle information directly from the vehicle 400. Communications between the vehicle identification device 402 and the fuel dispenser 200 can use an On Board Diagnostics (OBD) device such as OBDII technology in which the vehicle 400 includes an OBDII port.

For example, a fuel dispenser 200 may initiate a communication session with the consumer vehicle 400 and receive consumer vehicle information and operational metrics directly from the vehicle identification device 402. For example, the vehicle identification device 402 can monitor driving performance and diagnostics which can be provided to the fuel dispenser 200 for display on the fuel dispenser user interface 201 during a fueling session. The fuel dispenser 200 can further receive consumer vehicle information including mileage performance, whether the vehicle requires maintenance, the amount of fuel currently in the fuel tank, and the like. The transaction server 420 may responsively provide personalized consumer data including the amount of fuel needed to fill the vehicle's fuel tank based on the amount of fuel currently in the vehicle's fuel tank, and/or whether the vehicle is in need of maintenance as determined from the received consumer vehicle information and/or consumer profile data.

In another embodiment, the vehicle user interface 404 is operatively connected to a second network using a second network communication device. The second network communication device may be a subsystem of a vehicle infotainment system, a personal communication device, combinations of the aforementioned, and/or the like. The second network communication device establishes via a second network, communication with the remote transaction server 420. The second network may include a local area network (LAN), a cellular network, a wide area network (WAN), combinations of the aforementioned networks, and/or the like. The transaction server 420 may thus receive vehicle information and/or provide personalized content based on multiple routes including a route through the fueling environment (e.g., via transaction appliance 410, local area network 103, and/or fuel dispenser 200) or around the fueling environment (e.g., via cellular and/or wireless network 320).

For one or more first content items to be provided for display at the fuel dispenser 200, personalized consumer data or content is provided to the consumer by way of the transaction appliance 410 for display on the visual display device 201-2 during the fuel dispensing period. The visual display device 201-2 provides personalized information, such an advertisement or one or more redeemable discount coupons for purchasing products and services from a vendor or other data related to loyalty programs, promotions and contests. In response to the personalized consumer data provided to the consumer, a consumer transaction is then performed based on the selection made by the consumer interacting with the fuel dispenser user interface 201.

Similarly, for one or more second content items to be provided for display at the vehicle user interface 404, personalized consumer data or content is provided to the consumer by way of the transaction server 420 and/or transaction appliance 410 for display inside the vehicle 400 during the fuel dispensing period. Hence, personalized consumer data may further be provided to one or more consumers inside the vehicle not in close proximity to the visual display device, for example a waiting family member or other occupant inside the vehicle. The vehicle user interface 404 provides personalized information, such an advertisement or one or more redeemable discount coupons for purchasing products and services from a vendor or other data related to loyalty programs, promotions and contests. In response to the personalized consumer data provided to the consumer, a consumer transaction is then performed based on the selection made by the consumer interacting with the vehicle user interface 404.

In one embodiment, a consumer transaction is performed based on the selection made by the consumer interacting with the fuel dispenser user interface 201 and/or the vehicle user interface 404. By using the appropriate interface, the consumer indicates interest in the personalized consumer data and/or provides information indicating a confirmation to purchase a product and/or service or request additional information regarding products or services. If a consumer desires to purchase a product and/or service, the appropriate interface may be used to specify order data (e.g. quantity) and payment data. Alternatively, payment data may be pre-determined from a consumer profile.

If the purchase is approved, the transaction server 420 can then generate a message for the vendor or remote vendor regarding the purchase and generate a receipt for the consumer. Alternatively, a vendor coupon or receipt can be printed and the consumer can redeem the product and/or service from premises convenience store 107, quick serve food outlet or restaurant. An example of a product that can be purchased from a fuel dispenser is a cup of coffee. A consumer could for instance, pre-order a cup of coffee during the fuel dispensing period by providing input to confirm an offer provided by the fuel dispenser interface or vehicle interface. The customer could then pick the cup of coffee from the premises convenience store 107, quick serve food outlet or restaurant by indicating the fuel dispenser number or producing a printed out coupon.

Figure 5:
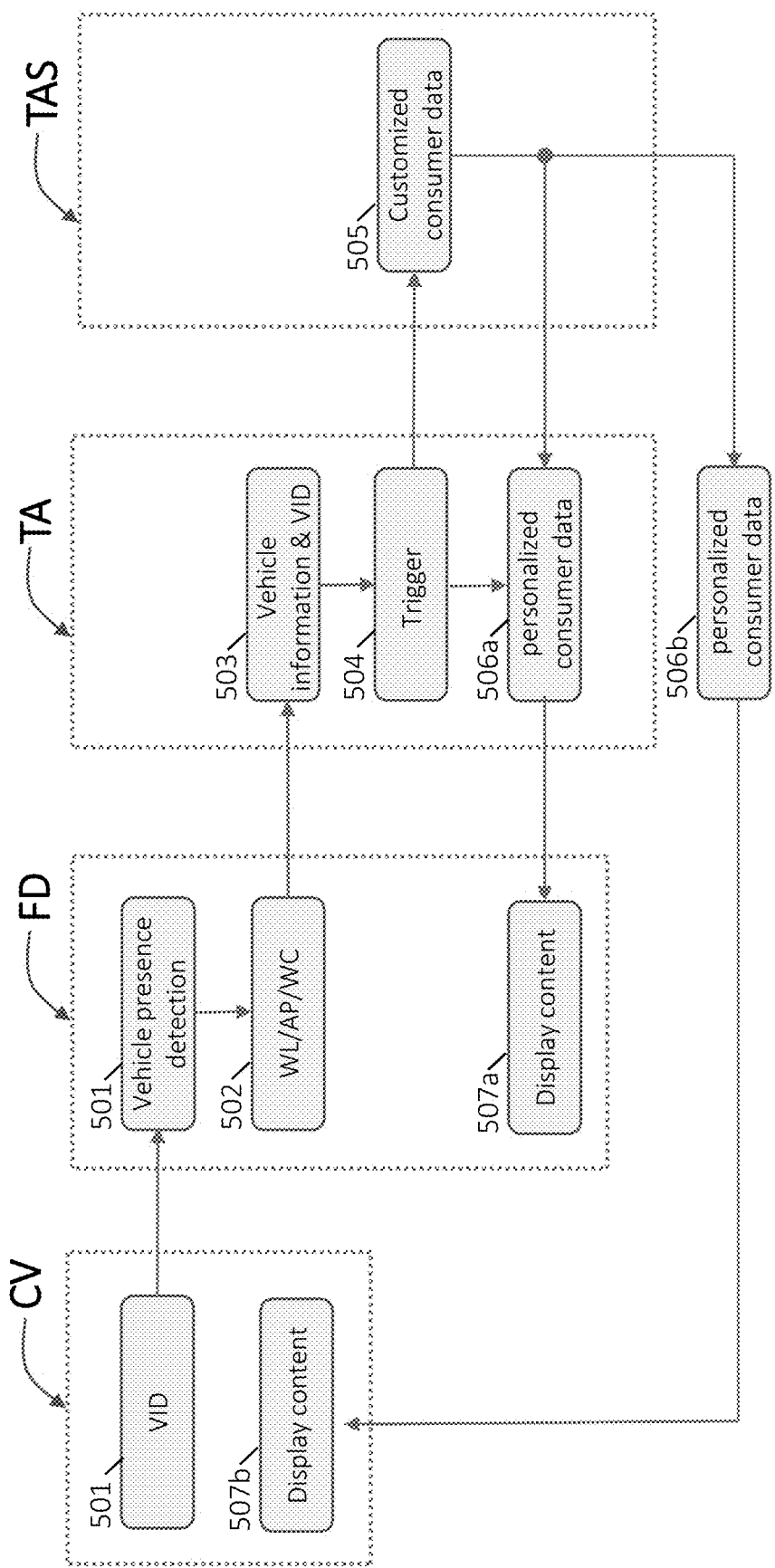
FIG. 5 is a process flow diagram for effecting a consumer transaction in a fueling station environment in accordance with some embodiments.

FIG. 5 is a process flow diagram for effecting a consumer transaction in a fueling station environment in accordance with some embodiments. At step 501, presence of a consumer vehicle 400 at a fuel dispenser 200 is detected and vehicle information from the vehicle 400 is transmitted to the transaction appliance 410. For example, in response to the wireless communication port 208 detecting that the consumer vehicle is proximate or within a threshold vicinity, it may initiate a communication session with the vehicle 400 and retrieve the consumer vehicle information including the vehicle identification number (VIN).

In response to detecting that the consumer vehicle is proximate thereto; at step 502 the fuel dispenser 200 initiates a first network communication with vehicle identification device 402 and retrieves the vehicle information including the vehicle identification number. At step 503, the fuel dispenser 200 transmits the vehicle identifying information, for example identification number and other vehicle information, to the transaction appliance 410 via the premises local area network 102. At step 504, the transaction appliance 410 transmits a transaction trigger to the transaction server 420 located remotely outside the retail fueling station environment. At step 505, the transaction server 420 responsively invokes personalized consumer data associated with the transaction trigger including advertising and promotions for purchasing products and services from a vendor. The personalized consumer data associated with the transaction trigger may be personalized based on one or more known characteristics of the customer, for example geographical region, spending patterns, fuel type purchased, historical purchases, and the like, and may be used to classify the customer into a particular customer group receiving advertisements and promotions for that group. In other examples, advertisements tailored to the specific customer may be invoked (e.g., based on specific past purchase behavior). At step 506*a*, the personalized consumer data is provided to the transaction appliance 410. For example, the transaction appliance may receive one or more first content items to be displayed at the fuel dispenser 200. The transaction appliance 410 in turn transmits the personalized consumer data to the fuel dispenser user interface 201. At step 506*b*, the personalized consumer data is provided via a second network communication to the user interface inside the vehicle (e.g., CVUI 404).

At step 507*a*, the personalized consumer data is provided to the consumer via the fuel dispenser user interface 201 which includes a visual display device 201-2. At step 507*b*, the personalized consumer data is provided to the consumer via the user interface inside the vehicle (e.g., CVUI 404). Personalized consumer data including advertising and promotion information for purchasing products and services from a vendor is offered to the consumer during the time the consumer is dispensing fuel. In some embodiments, the personalized consumer data is simultaneously provided to the fuel dispenser user interface 201-2 and the user interface system inside the vehicle (e.g., CVUI 404). The personalized consumer data provided to the consumer during the fuel dispensing period may be synchronized. Thereafter the consumer interacts with the respective user interface to effect a transaction such as purchasing products and/or services from a vendor within the retail fueling environment or a remote vendor of goods and/or services.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A system for displaying content within a retail fueling station environment, comprising:
   a transaction appliance implemented on a computing system located within the retail fueling station environment and configured to receive vehicle information about a vehicle from a fuel dispenser over a local area network; and
   a transaction server implemented on a computing system located remotely outside the retail fueling station environment and configured to:
      receive the vehicle information from the transaction application over a wide area network;
      process the vehicle information to determine a consumer characteristic of an occupant of the vehicle;
      obtain a first content item based on the consumer characteristic for display at the fuel dispenser during a fuel dispensing period; and
      obtain a second content item based on the consumer characteristic for display at the vehicle during the fuel dispensing period,
      wherein the first content item and the second content item include differences based on the consumer characteristic, the first content item being for display at the fuel dispenser, and the second content item being for display at the vehicle.

2. The system of claim 1, wherein the first content item and the second content item are simultaneously displayed on a graphical user interface of the vehicle and a graphical user interface of the fuel dispenser, respectively.

3. The system of claim 1, wherein the transaction appliance is configured to receive the first content item from the transaction server via the wide area network, and to provide the first content item to the fuel dispenser that sent the vehicle information.

4. The system of claim 3, wherein the transaction appliance is further configured to receive the second content item from the transaction server, and to provide the second content item to the vehicle proximate to the fuel dispenser.

5. The system of claim 3, wherein the transaction server is configured to provide the second content item to a graphical user interface of the vehicle over a communication network separate from the local area network of the retail fueling station environment.

6. The system of claim 1, wherein:
   the transaction server is configured to determine a profile correlating at least one of consumer profile data, consumer history data, loyalty program data, and fueling preferences with the vehicle information, to select the first content item based at least in part on the determined profile, and to select the second content item based at least in part on the determined profile.

7. The system of claim 6, wherein the first content item and the second content item include a personalized vendor offer to complete a transaction that is separate from a fuel dispensing transaction.

8. The system of claim 6, wherein the differences between the first content item and the second content item are based on the profile.

9. The system of claim 1, wherein the transaction server is configured to receive consumer information of the occupant of the vehicle, and to determine the consumer characteristic based on a combination of the consumer information and the vehicle information.

10. The system of claim 1, further comprising:
    one or more fuel dispensers each configured to detect a vehicle in its proximity, the one or more fuel dispensers including a wireless communication module configured to obtain the vehicle information from the vehicle.

11. A method of displaying content within a retail fueling station environment, the method comprising:
    receiving, at a transaction appliance implemented on a computing system located within the retail fueling station environment, vehicle information about a vehicle from a fuel dispenser over a local area network;
    receiving, at a transaction server implemented on a computing system located remotely outside the retail fueling station environment, the vehicle information from the transaction application over a wide area network;
    processing the vehicle information to determine a consumer characteristic of an occupant of the vehicle;
    obtaining a first content item based on the consumer characteristic for display at the fuel dispenser during a fuel dispensing period; and
    obtaining a second content item based on the consumer characteristic for display at the vehicle during the fuel dispensing period,
    wherein the first content item and the second content item include differences based on the consumer characteristic, the first content item being for display at the fuel dispenser, and the second content item being for display at the vehicle.

12. The method of claim 11, further comprising displaying the first content item and the second content item simultaneously on a graphical user interface of the vehicle and a graphical user interface of the fuel dispenser, respectively.

13. The method of claim 11, further comprising:
    receiving, at the transaction appliance, the first content item from the transaction server via the wide area network; and
    providing the first content item to the fuel dispenser that sent the vehicle information.

14. The method of claim 13, further comprising:
    receiving the second content item from the transaction server; and
    providing the second content item to the vehicle proximate to the fuel dispenser.

15. The method of claim 13, further comprising:
    providing, with the transaction server, the second content item to a graphical user interface of the vehicle over a communication network separate from the local area network of the retail fueling station environment.

16. The method of claim 11, further comprising:
determining a profile correlating at least one of consumer profile data, consumer history data, loyalty program data, and fueling preferences with vehicle information;
selecting the first content item based at least in part on the determined profile describing use of the retail fueling station environment; and
selecting the second content item based at least in part on the determined profile describing use of the retail fueling station environment.

17. The method of claim 11, wherein:
the first content item and the second content item include a personalized vendor offer to complete a transaction that is separate from a fuel dispensing transaction.

18. A method of displaying content within a retail fueling station environment, the method comprising:
detecting a vehicle proximate to a fuel dispenser;
obtaining, using a wireless communication module, vehicle information of the vehicle;
relaying the vehicle information to a transaction server implemented on a computing system located remotely outside the retail fueling station environment;
obtaining consumer information of an occupant of the vehicle at the transaction server;
processing the vehicle information and the consumer information to determine one or more consumer characteristics of using the retail fueling station environment;
determining a first content item for display at the fuel dispenser based on the one or more consumer characteristics;
determining a second content item for display at the vehicle based on the one or more consumer characteristics;
displaying the first content item at the fuel dispenser during a fuel dispensing period; and
displaying the second content item at the vehicle during the fuel dispensing period,
wherein the first content item and the second content item include differences based on the one or more consumer characteristics, the first content item being for display at the fuel dispenser, and the second content item being for display at the vehicle.

19. The method of claim 18, further comprising:
determining a profile correlating at least one of consumer profile data, consumer history data, loyalty program data, and fueling preferences with the vehicle information;
selecting the first content item based at least in part on the determined profile describing use of the retail fueling station environment; and
selecting the second content item based at least in part on the determined profile describing use of the retail fueling station environment.

20. The method of claim 18, wherein the first content item and the second content item include a personalized vendor offer to complete a transaction that is separate from a fuel dispensing transaction.

* * * * *